(12) United States Patent
Bolz et al.

(10) Patent No.: US 11,072,908 B2
(45) Date of Patent: Jul. 27, 2021

(54) WORK MACHINE HAVING A DISPLAY DEVICE

(71) Applicant: Liebherr-Hydraulikbagger GmbH, Kirchdorf/Iller (DE)

(72) Inventors: Gerhard Bolz, Kirchdorf/Iller (DE); Dieter Ansorge, Rot an der Rot (DE); Florian Mang, Memmingen (DE)

(73) Assignee: Liebherr-Hydraulikbagger GmbH, Kirchdorf/iller (DE)

( * ) Notice: Subject to any disclaimer, the term of this patent is extended or adjusted under 35 U.S.C. 154(b) by 308 days.

(21) Appl. No.: 16/044,603

(22) Filed: Jul. 25, 2018

(65) Prior Publication Data

US 2019/0032304 A1    Jan. 31, 2019

(30) Foreign Application Priority Data

Jul. 25, 2017 (DE) .................... 10 2017 116 822.2

(51) Int. Cl.
```
G02B 27/01      (2006.01)
E02F 9/16       (2006.01)
E02F 9/26       (2006.01)
E02F 9/20       (2006.01)
B60K 35/00      (2006.01)
```

(52) U.S. Cl.
CPC ............ *E02F 9/16* (2013.01); *B60K 35/00* (2013.01); *E02F 9/163* (2013.01); *E02F 9/166* (2013.01); *E02F 9/205* (2013.01); *E02F 9/261* (2013.01); *E02F 9/264* (2013.01); *G02B 27/0101* (2013.01); *G02B 27/0149* (2013.01); *G02B 27/0179* (2013.01); *B60K 2370/1529* (2019.05); *G02B 2027/014* (2013.01); *G02B 2027/0138* (2013.01); *G02B 2027/0141* (2013.01); *G02B 2027/0154* (2013.01); *G02B 2027/0181* (2013.01); *G02B 2027/0187* (2013.01)

(58) Field of Classification Search
CPC ............ G02B 27/0149; G02B 27/0179; G02B 27/0101; G02B 2027/014; G02B 2027/0138; G02B 2027/0141; G02B 2027/0154; G02B 2027/0181; G02B 2027/0187
See application file for complete search history.

(56) References Cited

U.S. PATENT DOCUMENTS

2015/0180999 A1    6/2015  Pisz
2016/0193920 A1*   7/2016  Tsubone .................... E02F 9/16
                                                          701/36

FOREIGN PATENT DOCUMENTS

| DE | 102012019506 A1 | 4/2014 |
| DE | 102014006724 B3 | 9/2015 |
| DE | 112013006256 T5 | 10/2015 |
| DE | 102014221438 A1 | 4/2016 |

\* cited by examiner

*Primary Examiner* — Joseph P Martinez
(74) *Attorney, Agent, or Firm* — Dilworth & Barrese, LLP

(57) ABSTRACT

The invention relates to a work machine having an operator's cabin comprising at least one window or screen.

14 Claims, 5 Drawing Sheets

WORK MACHINE HAVING A DISPLAY DEVICE

BACKGROUND OF THE INVENTION

The invention relates to a machine, in particular a work machine or construction machine, having an operators cabin comprising at least one window or screen.

Work machines and construction machines are known from the prior art that have an operator workplace arranged directly on the machine. A drivers position is here typically provided within the operator workplace in which a driver or an operator can sit and can take over the operation or control of the machine.

In known machines, with a conventional construction, the operation of a piece of work equipment of the machine and also of a rotational movement or another movement of the machine takes place via manual control units that actuate control valves by hydraulic and/or electric signals to conduct an oil flow to corresponding hydraulic cylinders.

In this respect, in dependence on the distance or on the excursion at the manual control units, a corresponding amount of oil is conducted to a respective hydraulic cylinder.

The control movements of the manual control units are typically carried out by an operator who as a rule sits on or in the machine.

It is furthermore known from the prior art to transfer at least some of the functions of conventional operations or at least part of the operation of the machine to an external operating unit. An operator can thus stand next to the machine and/or can be spaced apart from it and can control the machine via a remote control.

A corresponding workplace is shown in FIG. 1. In this respect, a display is arranged in the front right region of the drivers workplace by means of which information for the operation of the machine can be visualized.

In addition, different settings and operations are carried out via the display. In this respect, the operation can take place directly via the display (touch display) or via differently designed navigation elements.

The display can also be used for 2D and 3D excavation control systems that can display the spatial direction to be removed to the driver of an excavator, for example. The driver or operator can here work according to arrow displays, for example.

However, due to the tight space relationships in the drivers workplace of, for example, a construction machine, displays of any desired size cannot be used. The existing display surface of a display may not be sufficient due to the increasing amount of information to be displayed such as unit monitoring data, excavation systems, boundaries, automation data.

On average, display units having a size of approximately 7 inches are installed in known construction machines. In most cases, their arrangement takes place around the right A column, as shown in FIG. 1. The arrangement takes place both in landscape mode and in portrait mode. Warnings and monitoring data such as of the rear zone or of the side zone have to be displayed on this surface and are therefore small. Alternatively, the information has to be output via additional devices such as loudspeakers or acoustic warning sounds. The driver is disadvantageously stressed or distracted by these additionally required output modes.

Relevant standards for the design of the display of camera-assisted side zone devices and rear zone devices have to be observed, for example, which requires the use of a plurality of displays depending on the unit equipment.

Against this background, it is the object of the invention to provide a machine that enables an improved output or visualization of information for the driver. The visualization can here be specific to the construction unit or to the machine.

SUMMARY OF THE INVENTION

This object is achieved in accordance with the invention by a machine having the features herein. Advantageous embodiments are also the subject of the invention herein.

A machine, in particular a work machine or a construction machine, is accordingly provided having an operator's cabin comprising at least one window or screen, wherein at least a part of the window or screen is configured as a display surface of a display device for displaying information. The window or screen can naturally be a window or screen of the operators cabin through which the operator can look from the interior of the operators cabin to the outside. A larger surface for the display of information than is the case in accordance with the prior art is available due to the use of the window or screen or of a part of the window or screen of the operator's cabin. If reference is made to a work machine here, a construction machine can also always be meant by it.

It is conceivable in a preferred embodiment of the invention that the window or screen is a side window and/or a front screen of the operator's cabin and/or that the window or screen is divided into two part windows or screens that can in particular be horizontally separated and/or pivoted. Due to the divisibility of the window or screen, in particular a front screen, but also a side window, can be pivoted or divided in dependence on the needs of the driver and a partly open operation of the machine can thus be made possible. Provision can also be made that more than one window or screen of the operators cabin is used as a display surface of the display device. It is, for example, conceivable that the front screen and a least one side window of the operator's cabin is configured as a display surface.

It is conceivable in a particularly preferred embodiment of the invention that the upper one of the part windows or screens is displaceable and/or pivotable beneath the cabin roof and/or can be stowed and/or fixed in position beneath the cabin roof. The pivoted part of the window or screen can hereby be protected beneath the cabin roof and in so doing does not impede the driver on the carrying out of work within the operator's cabin. The kind of actuation or the influence of a power-assisted opening does not play any role here.

It is conceivable in a further preferred embodiment that the lower one of the part windows or screens is upwardly displaceable and/or pivotable, with the lower part window or screen in particular being able to be arranged in the upper third of the window or screen region.

In an embodiment in which the lower part window or screen is configured as a display surface of the display device and, for example, has transparent or partly transparent display sections, a display possibility can correspondingly be present by using the lower part window or screen. In this respect, the operators cabin can be in a partly open state in which the upper part window or screen is, for example, pivoted below the cabin roof and is not easily visible for the driver.

It is conceivable in a further preferred embodiment that the window or screen comprises an unchanging grating in which similar information is located at the same points of the window or screen. The use of the machine is hereby simplified since the driver can better access the fixedly associated information.

It is conceivable in a further preferred embodiment that warning information can be displayed in a middle region of the window or screen. Said information can thereby be detected particularly simply and fast by the operator so that hazardous situations can be recognized particularly fast.

It is conceivable in a further preferred embodiment that the display surface is configured to display information in mirrored form depending on the position of an operator. The machine can here comprise a device by means of which it can be detected whether an operator or driver is located inside or outside the operator's cabin and/or the distance the operator is from the window or screen can be detected. If the device recognizes that an operator is outside the operator's cabin and controls the machine from the outside, mirror inverted information can be displayed on the window or screen that is accordingly not mirror inverted from the outside and is thus simply recognizable for the operator.

It is conceivable in a further preferred embodiment that the display device is configured to vary the size of the information displayed in dependence on the position of an operator. The corresponding size adaptation can be effected or instigated by means of an above-named device for detecting the distance of the operator.

It is conceivable in a further preferred embodiment that the machine comprises an eye tracking device to track the direction of gaze of the operators. A dynamic display in the direct field of view of the driver is made possible by an eye tracking device so that it can be ensured more simply that important information for the driver can actually be seen by him. The eye tracking device can here be coupled to the display device and to a regulation/control or to an onboard computer of the work machine and can correspondingly be used to adapt the displayed information.

It is necessary for the correct representation of a contour, of an excavation volume, of installed lines, etc. to know the exact location of the unit and to have the planning data available.

Provision can furthermore be made in a further preferred embodiment that the machine comprises a projector to project information onto the base of the machine.

The term base is not to be understood as restrictive in the present case and can comprise any structures present in the region of the machine. Information that can be seen by the operator of the machine can be projected onto the base of the machine by means of the projector, such as a laser projector. The projector here can, like the eye tracking device, be coupled to the regulation/control or to the on-board computer and can thus be controlled accordingly. The requirements for this are the same as the above-named.

BRIEF DESCRIPTION OF THE DRAWINGS

Further details and advantages of the machine are explained with reference to the embodiment shown by way of example in the Figures. There are shown.

DESCRIPTION OF THE PREFERRED EMBODIMENTS

The invention relates to the visualization of information specific to construction equipment, for example on the front screen of an operator's cab of a work machine. The work machine in accordance with the invention can in particular be characterized by dynamic visualizations, by a screened display, by automatic display switchover and/or by driver-specific alignments. The invention implements display technologies in the window or screen of a work machine configured as a display surface. The display surface can here be a permanently present visualization surface.

In work machines of the category, two-part front screen elements are installed that can be completely opened by the driver. This possibility is restricted by the window or front screen as a visualization surface. A technical solution can here be a single-part window glazing in the simplest case.

Figure 7:
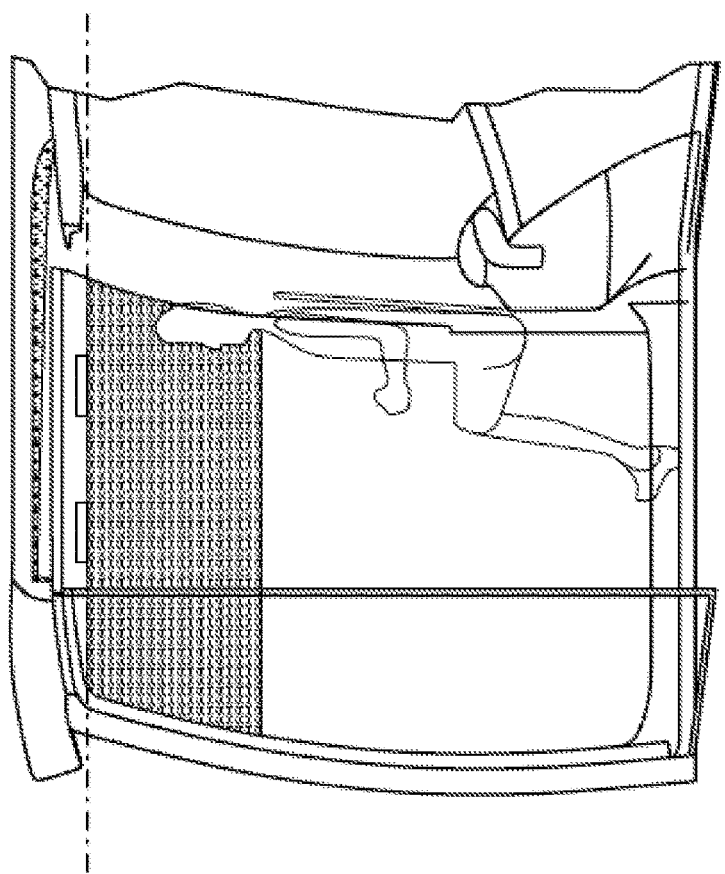
FIG. 7: the design of the window of a work machine in accordance with the invention in the open state of the operator's cabin.
Figure 6:
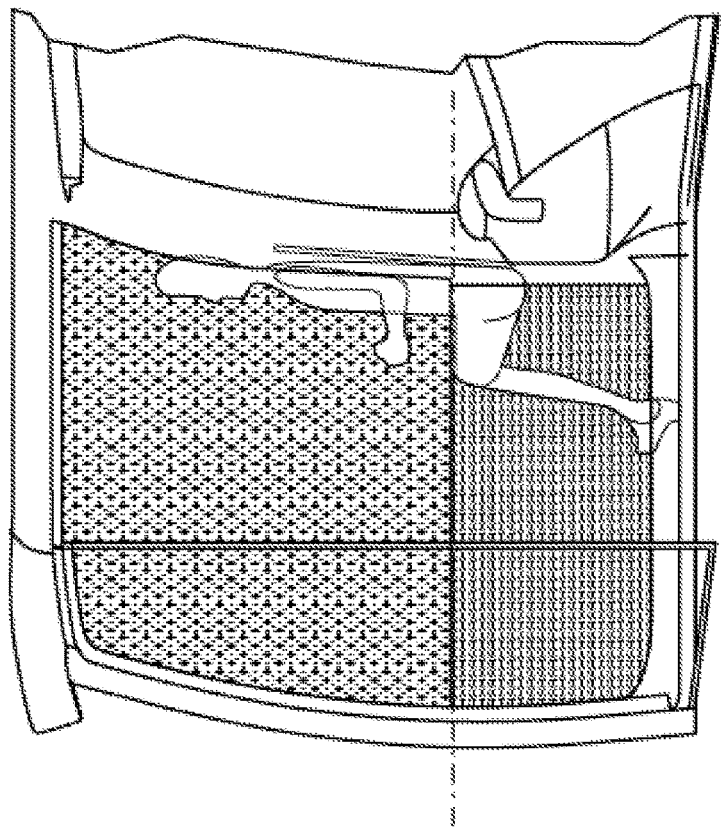
FIG. 6: the design of a window of a work machine in accordance with the invention with a closed operator's cabin.

As a technical innovation, a window or screen system that is in particular openable and in which a lower window or screen element is provided rotatably at the upper window or screen element is described in FIGS. 6 and 7. The upper window or screen is stored under the cabin roof by the opening of the window or screen system while the lower window or screen remains in the upper third of the window or screen region and serves as a reduced display surface. The window or screen can be a front screen of the operator's cabin and can alternatively or additionally be a side window or a rear window.

The invention enables the visualization of information and the dynamic visualization of unit-related and job-related characteristics directly on the front screen and/or on another window or screen of the work machine. The work machine can be a self-propelled work machine or a construction machine.

The size and content of this display surface on the front screen are considerably larger and more complex in comparison with the known display devices. The display can, for example, take place in a hydraulic excavator on a surface of approximately 850 mm×1500 mm. A currently typical 7" display in contrast has a display surface of approximately 92 mm×155 mm. The use of the new display type means an increase of the display surface by approximately 90 fold. Dynamic displays can be provided that visualize job-related and/or unit-related information. Excavation contours with installed pipelines or electric lines can here, for example, be displayed directly on the front screen and placed over the real time image.

For an improved intuitive characteristic of the display, it is possible to make use of an unchanging grating that divides the window or screen surface into different zones or grating zones having a respective job or having a respective type of information.

Zones can be provided here for basic information, warnings, displays of current settings, fields for dynamic information monitoring and for unit environment monitoring. Learning success occurs due to always the same position of the displays and the driver can immediately associate the kind of information by a pop-up symbol or by the appearance of information in a specific zone of the window or screen.

Time-limited overlaps of displays can occur depending on the prioritization of the importance of the displays. A warning can, for example, always be displayed in the foreground. Safety-critical information can generally be prioritized the most. A dynamic display of an excavation contour can be covered here. In addition, a warning can be displayed centrally on the surface.

Depending on an operators action, this grating and the display of the prioritized information can differ. The example of persons located in the pivot region can be used for illustration here. Depending on the pivot direction, the driver will adopt different main directions of gaze. From this the display of warnings on the left window or screen can be the most sensible for the display of warnings on a pivot procedure.

Figure 2:
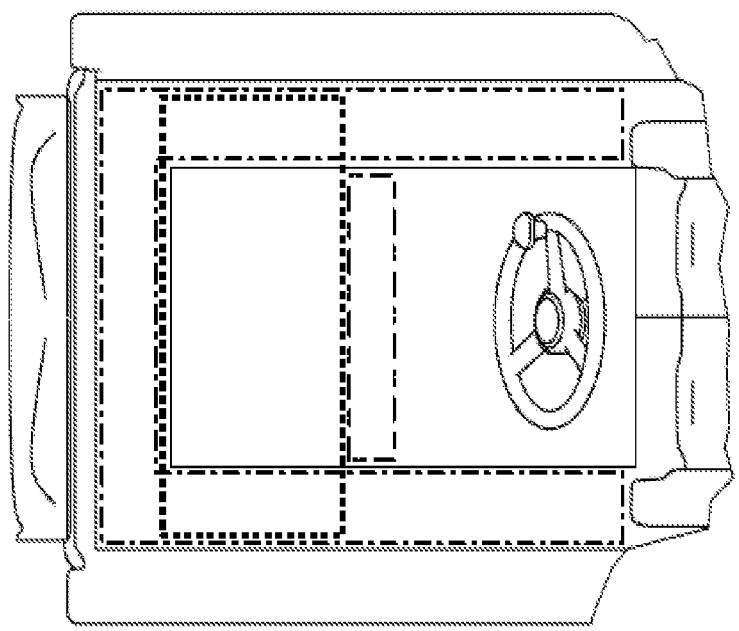
FIG. 2: an operator's cabin of a work machine in accordance with the invention.
Figure 1:
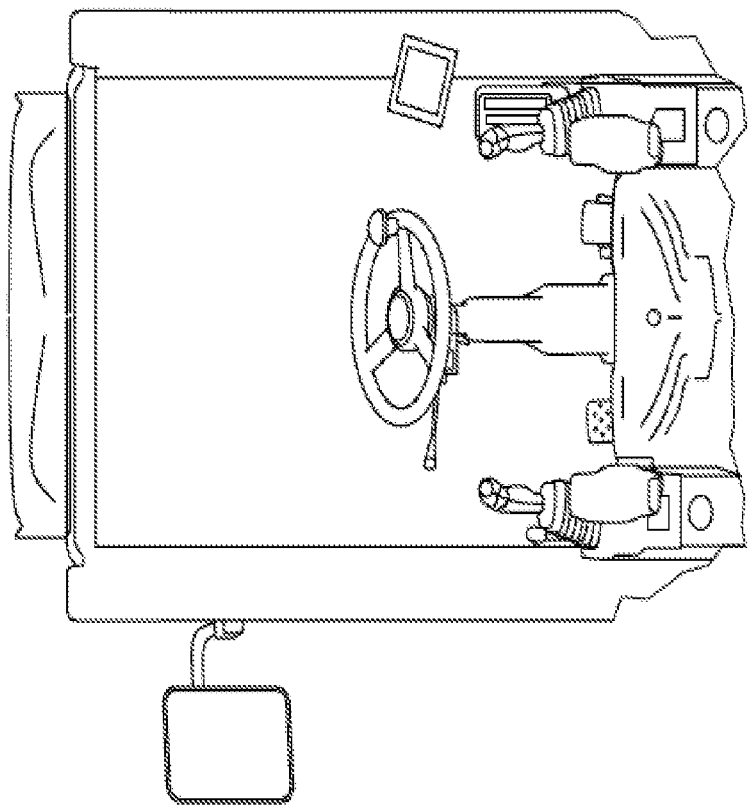
FIG. 1: an operators cabin in accordance with the prior art.

General information such as the speed, gear selection, information on the attachment, the time, and temperatures can in contrast be shown in the marginal zone of the window or screen. The grating of the front screen and the prioritization of the information can be seen from FIG. 2.

In a preferred embodiment of the invention, the display can be changed in dependence on the position of the operator. The visualization can be shown in mirrored form depending on whether the operator operates the work machine in the standard manner from the inside or from the outside by remote control.

A possibility of communication between the unit and the operator is thereby implemented that is indispensable for a totally remote controlled work operation. This display can also be divided into a grating and can follow the same prioritization as described above.

Figure 3:
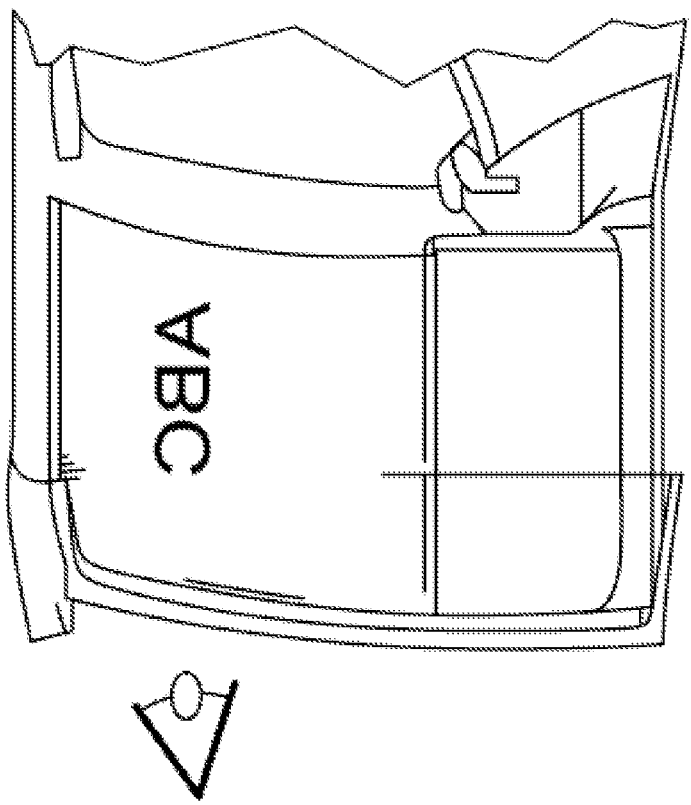
FIG. 3: a schematic representation of mirrored displays at a work machine in accordance with the invention.
Figure 3:
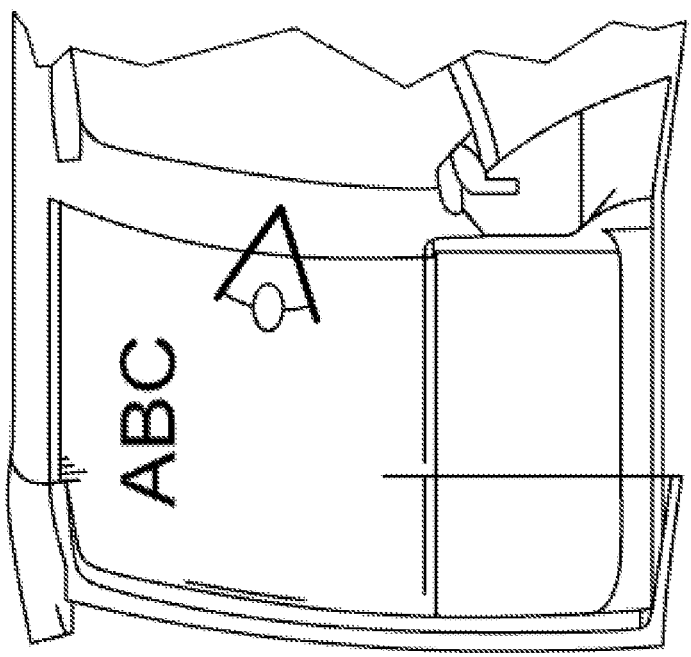

The adaptation of the display size can take place automatically in dependence on the distance of the operator. The good legibility of the information is ensured by this step. A schematic representation of the display in dependence on the position of the operator can be seen from FIG. 3. The side windows of the operator's cabin are also suitable in addition to the front screen for the representation of information in the remote controlled operating state.

The work machine can also comprise an eye-tracking device. The exact location and size of a centrally planned job can be presented in the direct field of view by calculation through the eye tracking in conjunction with 3D GPS data and 3D GPS systems. Depending on the device orientation, a dynamic representation and monitoring of the job can take place here. The efficiency of the job processing can hereby be increased and the error probability can be reduced. Measurement work is reduced or completely avoided by this function.

Alternatively or additionally to the dynamic display, a fixedly integrated projector such as a laser projector is conceivable at the device. This projector can likewise calculate and project a dynamic display directly on the floor via GPS signals and/or 3D GPS data.

Figure 4:
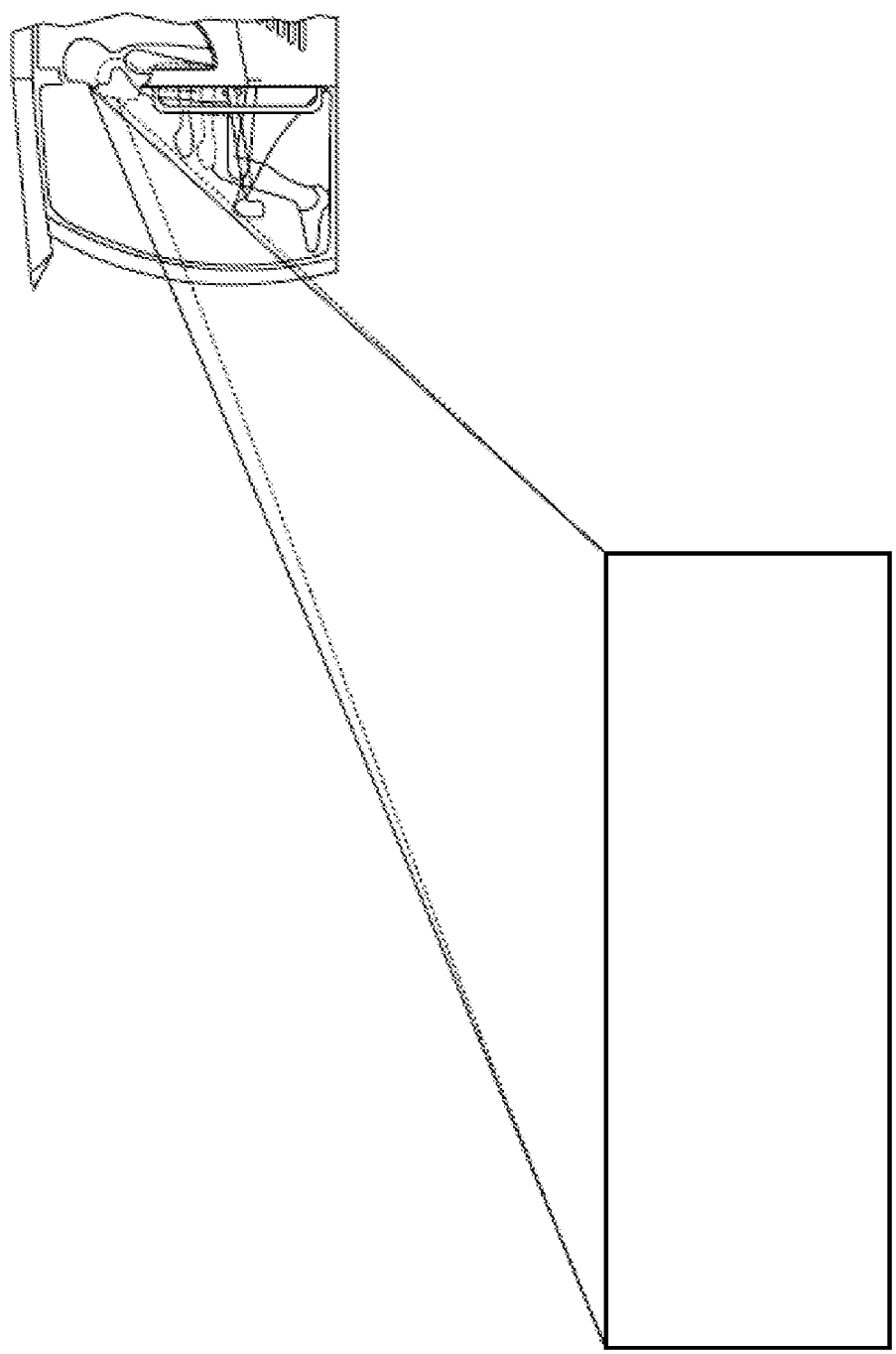
FIG. 4: changed visual conditions with different operators.
Figure 5:
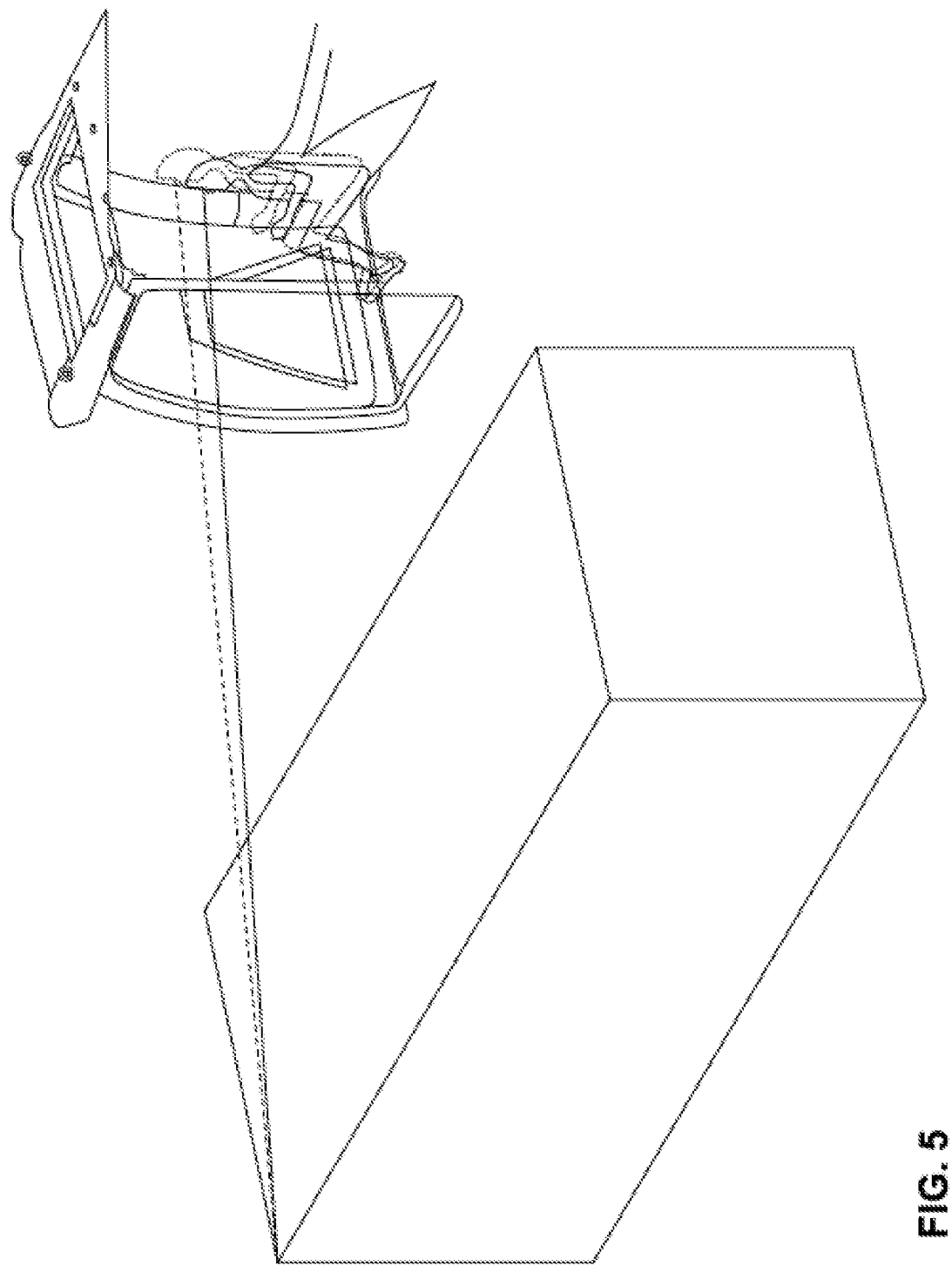
FIG. 5: changed visual conditions with different operators with different representations of information on a front screen.

A superposed representation of pipelines and/or electric lines can be used as multicolor superpositions in the direct field of view of the driver on the window or screen. A schematic representation of the display on the front screen in dependence on the changing projection center position can be seen from FIGS. 4 and 5. An assumed simple excavation volume and the representation on the front screen resulting from it are shown.

The work machine can comprise a window or screen having a two-part design that combines the possibility of the opening with the demand of a visualization surface that is as large as possible on the front screen. The schematic design of the innovation can be recognized in FIGS. 6 and 7. A rotatable hinge connection can be provided here between the upper and lower front screens. The upper front screen element can be stored beneath the roof lining by the opening of the front screen system. The lower front screen element can be displaced into the upper third of the front zone in the same motion. While the lower ⅔ of the front part is open, the lower front screen element remains in the upper third and serves as the visualization surface. The same also applies accordingly to an embodiment in which a side window is the display surface of the display device.

In accordance with the invention, a transparent display solution can be used independently of the display technology. Advantages can above all be found in the very large display surface and in the information visualization in the direct field of view of the operator.

Visual display units can furthermore be used that subconsciously draw the operators attention to a hazard.

The operator perceives warnings and information better by the direct display in the field of view. The direct display on a window or screen additionally has potential in a partial automation or, for example, a 3D-GPS assisted excavation procedure. The attention of the operator always remains in the primary field of view in accordance with the invention.

The approach in accordance with the invention primarily pursues the goal of simply presenting the operator with a plurality of pieces of information without stressing him in addition to the actual work.

Schematic unit overviews can be used to achieve a better unit association.

In accordance with the prior art, for example, a service job is shown as a red flashing symbol on the small display. To learn the actual service job, a corresponding submenu has to be accessed and the text has to be read.

The operator's attention is quickly and precisely drawn to an impending warning by the display directly in the field of view possible in accordance with the invention.

3D assisted jobs or job procedures will probably adopt an important significance for future work machines. This development requires other types of visual representations.

Dimensions and interfering contours such as pipelines or electric lines in the ground can accordingly be displayed in a work job such as an excavation. A small symbol on the display can indicate the recommended attachment tool.

A tool recommendation can be output to the operator by an existing attachment tool database on the job to be worked through and knowledge of the property of the subsoil. An increase in efficiency can hereby be achieved.

A real time visualization can be presented in accordance with the invention for the exemplary excavation. The outer contours of the excavation can be visualized and pipelines located in the ground can be presented.

For orientation, the current excavation depth can be displayed and the critical depth can be represented as a warning at the same scale.

In accordance with the invention, persons and/or objects located in the unit environment or in the environment of the work machine can also be recognized and/or displayed.

The requirement is a person and/or object recognition that is coupled to the display device and/or, for example, to an on-board computer.

The positions of a person or of an object can be represented as a running symbol on the window or screen. In addition, the distance from the person can be indicated by a corresponding driver's position inner lighting. The intensity of the lighting can be increased or reduced here in dependence on the distance of the work machine from the person and/or from the object.

In addition to the display, an automatic rotating mechanism limitation is conceivable as a further increase of the unit safety.

The work machine can furthermore be coupled to a drone. The use of a drone can be sensible to provide an improved overview of the work machine and/or of the total construction site/transfer work. The drone can hover directly above the unit in deployment and can generate a high resolution real time visualization. This visualization can be displayed in full or in part on the display surface. Depending on the interest, the zone or the displayed zone can be controlled via the altitude of the drone.

In addition, for example, a drone can be used for a status tracking of a job, for example by determining the terrain profile and comparison of a desired state. In addition, image files generated in parallel can be presented superposed to the driver in the direct field of view.

The invention claimed is:

1. A work machine having an operator's cab comprising at least one window or screen mounted within the operator's cab, wherein
    at least a part of the window or screen is configured or serves as a display surface of a display device for displaying information,
    the window or screen is at least one of a side window, a front screen and a roof window of the operators cab,
    the window or screen is divided into two parts that are horizontally separable from one another and separately pivotal from one another, and
    the display surface is configured to display information in mirrored form in dependence on the position of an operator.

2. A work machine in accordance with claim 1, wherein the upper one of the part windows or screens is displaceable and/or pivotable below the cabin roof and/or can be stowed and/or fixed below the cabin roof.

3. A work machine in accordance with claim 1, wherein the lower one of the part windows or screens is upwardly displaceable and/or pivotable, with the lower part window or screen in particular being able to be arranged in the upper part zone of the window or screen zone.

4. A work machine in accordance with claim 1, wherein the window or screen comprises an unchanging grating in which similar information is located at the same points of the window or screen.

5. A work machine in accordance with claim 1, wherein warning information can be displayed in a middle zone of the window or screen.

6. A work machine in accordance with claim 1, wherein warnings dynamically adapt to the respective driver's field of view.

7. A work machine in accordance with claim 1, wherein the display dynamically adapts to the respective environmental influences.

8. A work machine in accordance with claim 1, wherein the display device is suitable to vary the representation of the displayed information in dependence on the position of an operator.

9. A work machine in accordance with claim 1, wherein the work machine comprises an eye tracking device to track the direction of gaze of an operator.

10. A work machine in accordance with claim 1, wherein the machine comprises a projector for projecting information onto the window or screen of the machine serving as the projection field.

11. A work machine in accordance with claim 1, wherein an image is placed over the driver's field of view as a superposed image file.

12. A work machine in accordance with claim 11, wherein the image is a camera image.

13. A work machine in accordance with claim 1, wherein the window or screen is at least partly transparent.

14. A work machine in accordance with claim 13, wherein the window or screen is transparent.

* * * * *